Patented Aug. 25, 1942

2,294,239

UNITED STATES PATENT OFFICE 2,294,239

ABRASIVE ARTICLE

Emil E. Novotny, Philadelphia, Pa., and Joseph N. Kuzmick, Clifton, N. J., assignors of one-half to Durite Plastics, Incorporated, Philadelphia, Pa., a corporation of Pennsylvania, and one-half to Raybestos-Manhattan, Inc., Passaic, N. J., a corporation of New Jersey No Drawing. Application April 9, 1938, Serial No. 201,184

5 Claims. (Cl. 51—298)

This invention relates to the manufacture of abrasive wheels, discs, segments, etc. comprising abrasive grains bonded with a resin containing phenolic (OH) groups, which may be synthetic or natural, and including a heavy calcined reactive magnesium oxide such as heavy calcined reactive magnesite, ground to a fineness of at least 100 mesh and preferably a fineness of 98% through 325 mesh or finer, said reactive magnesite being uniformly and minutely dispersed in a solid comminuted form throughout the composition of abrasive grains and resin bond.

It is our object to provide an abrasive composition which when formed into an abrasive wheel by quick so-called cold molding methods (although this does not preclude the use of heated molds), and heat hardening, has the combination of the good characteristics of the vitreous bonded and the resinoid bonded wheels, such combination not being heretofore present in any one product.

The product can be made as hard as the hardest of vitreous bonded wheels if desired, with the free cutting qualities of such wheels, but having a strength and tenacity of bond superior to the strength of resinoid bonded wheels. The product may be used at the low operating speeds of the former and the high operating speeds of the latter, thus providing resinoid wheels for slow speed spindles which are of greater efficiency than vitreous bonded wheels, and conversely, providing wheels of great hardness and strength so they may be operated on high speed spindles, where available, with the free cutting qualities of vitreous bonded wheels with further economies and increased speed of cutting. Furthermore, a personal safety factor is provided should a wheel intended for a low speed spindle be inadvertently placed upon a high speed spindle, which has happened with disastrous consequences to life and limb.

The hardness and strength is uniform throughout. The product is devoid of soft centers even though the cross section is relatively thick. When fractured intentionally the product shows a tenacious adhesive matrix bonding the abrasive grains with a strength so great that such fracture severs substantially all of such unitarily bonded grains. This unity of bond provides for long wear inasmuch as abrasive grains when dull are severed to new cutting edges instead of being forced out from the bonding matrix.

The calcined heavy magnesite is particularly selected due to its functionally useful reactivity with resins comprising reactive phenolic (OH) groups, its density and incompleteness of reaction which provides an ideal filler, its action as a slow but complete cure accelerator even in heavy thick cross sections, a limited alkalinity forming resinates with phenolic bodies and other resins and forming these sufficiently in advance to prevent the formation of various ammonia resinates and other ammonia side reaction products including aniline as in the case where hexamethylenetetramine is used as a hardening agent for a phenol resin, the ability of fixing volatiles such as water, occluded or synthetic, which is held even at the maximum curing temperatures of say 400° F. The filler while reactive is nevertheless still a filler in that when a portion of it has been combined or has undergone chemical change throughout the reaction cycle such product has the density, particle size and hardness which is ideal for its use as a filler in abrasive compositions.

For this reason it can be clearly noted that the magnesium oxide selected is of the heavy calcined reactive type and specifically excludes the fluffy products or the dead burnt magnesium oxide, both of which are relatively useless for this purpose. We require a product of predetermined alkalinity, density, reactivity and particle size and we depend upon this product to be in comminuted pulverized form and to be used in a quantity sufficient to constitute at least a part of the total filler used in an abrasive mixture.

The proportion as to filler content, however, to obtain optimum results requires that the ratio in a heavy dense wheel be at least 20 parts and may be used up to 150 parts to 100 parts of phenol resin by weight. In the heavy dense wheels the heavy calcined magnesite can be used in from 60 to 100 parts also by weight.

We might state that there are a number of accelerators, some of which could be also considered as reactive fillers, and a number of these accelerators can be either acidic or basic in properties, and we might mention under the fillers products such as calcium, barium, potassium, sodium, etc., and more specifically we might state their oxides, but none of these products provide the results. Still further among the filling materials might be considered asbestos, infusorial earth, Cryolite, Syncrolite, etc., etc., but these products do not provide the particular functional results we are after.

As a further explanation we might state that the alkali metals ranging as cesium, rubidium, potassium, sodium and lithium, and the alkaline earth metals ranging as barium, strontium, calcium and magnesium provide an order of strength of alkalinity wherein the alkali metals are too strongly alkaline and this is also true of the alkaline earth metals until we descend in the series to the weakest one, i. e., magnesium, that we find an instance where the total energy interchange involved in the consumption of the phenolic (OH) group and the appearance of the base oxide or hydroxide that the energy becomes positive. When the element stands below magnesium, assuming all things equal the tendency for such a metal tied up with the phenolic (OH) group to be cleaved off to form the oxide or hydroxide, as the case might be, will be correspondingly greater. On the other hand, the tendency for the base to react with a phenolic (OH) group is correspondingly diminished as it stands lower and lower in the series.

Thus, there are two opposing factors. If the base is too strongly alkaline it reacts too vigorously with the free phenolic OH groups of the resin to form the corresponding resinate, and these resinates of strong alkalis, in turn, are so stable that they are exceedingly difficult to cure in a satisfactory manner. On the other hand, if the base is too weakly alkaline, it reacts only with difficulty or not at all with the phenolic OH groups of the resins, and such resinates as are formed are so unstable as to be of little or no value. It is only where we have the balance or equilibrium where resinates may be quite readily formed, but at the same time they are not sufficiently stable as to interfere with the curing of the resin, that we achieve the desired end. In magnesium, and most particularly in the heavy calcined reactive types of magnesium, these properties manifest themselves to the utmost degree to meet these peculiar requirements.

It should also be understood that in our invention a substantial filler content is required and while it is readily understood that any of these basic materials could be used in proportions with respect to the resin to provide a certain pH, it is the speed of reactivity and the alkalinity of the product as a filler including various other functions which have shown us that only certain types of magnesium oxide products of the reactive type comminuted to a certain fineness provide the combination of alkalinity and filler as one part of our requirement.

It should be understood that the heavy calcined magnesite is by no means a pure compound and comprises a blend and is most suitable for our purpose functionally and therefore any blend having similar reactivity should be construed as being equivalent to such magnesite for our use.

The matter of use of the magnesium oxide as a filler and reacting body is important and therefore the particle size of from 60 mesh to a body finer than 325 mesh is desirable. The combination with a liquid resin should be made shortly prior to use in the abrasive mixture inasmuch as such liquid resin wets the magnesite and is more reactive with it than a solid pulverized resin. Good dry granular mixes may be made through the use of a liquid resin and magnesite alone, the product forming a relatively dry mix much on the same principle as the controlled alkalinity in the wet-dry mix, an application of Emil E. Novotny, Serial No. 90,490, dated July 14, 1936.

Usually, however, the magnesite is added with or as a mixture with the dry resin, blended in definite proportions, to which a further quantity of dry pulverized resin without such filler may be added should the percentage of filler present in the compound be higher than required.

In the manufacture of wheels we can use the liquid resin-dry resin method such as that exemplified by U. S. Patent 2,111,248, issued to Emil E. Novotny, March 15, 1938, or we can use the usual solvent methods such as that exemplified by patent to Harry C. Martin, 1,626,246, issued April 26, 1927, and it is possible to utilize liquid resins containing various solvents such as furfural, furfuryl alcohol, cellosolve, methyl cellosolve, etc. The manner of mixing, pressing and curing is already well known in the art.

In the liquid resin-dry resin methods and in the use of furfural as a wetting agent for the abrasive grain the use of the magnesite product is particularly useful inasmuch as it is not necessary to consider the use of a minimum amount of liquid resin nor is it necessary to use great care in the amount of furfural applied to the grains and therefore all of the filler and all of the pulverized resin can be suspended on the grains providing even a wet mix to begin with, which upon standing dries to the proper dry requirements through the reaction of the magnesite with either the liquid resin or the furfural, providing a product so far as the self-drying feature is concerned somewhat similar to the wet-dry mix of the Novotny application, Serial No. 90,490, dated July 14, 1936, previously mentioned.

This brings about advantageous functional properties in that the product can be plasticized or wetted to the extent necessary to pick up all of the resin so there is no vagrant resin in the mix and upon standing or by the use of proper proportions of magnesite provide a mix which is sufficiently dry to compress to a very dense product without requiring exceptional pressures, or in other words the plasticity may be controlled to the exact limits required.

The magnesite is our ideal filler. However, it is to be understood that other fillers of a reactive or inert nature may be used with such magnesium oxide products and that therefore we consider the presence of a suitable amount of magnesium oxide in its comminuted pulverized form in the presence of lesser or greater amounts of other fillers as being in a sense equivalent and falling within the scope of the appended claims. As for example, we may use with the magnesite Cryolite, Syncrolite, asbestos floats, alumina flour, "B" and "C" stage resins, etc., etc. Therefore we do not limit ourselves to the use of magnesite alone and do not preclude the use of other fillers with such magnesite.

The resins called for are specified as natural resins having phenolic (OH) groups such as exemplified by gum accroides, the various synthetic phenol resins such as exemplified by phenol-aldehyde, phenol-formaldehyde or phenol-furfural resins. That is, all of these resins contain phenolic (OH) groups, and while we prefer to use liquid and pulverized resins it is understood that we use either alone or both in combination with abrasive grains in making such mixtures. It is also to be understood that while we have used the term "phenolic resins" or "resins containing phenolic (OH) groups" we refer to the various phenol compounds such as phenol, cresol, the xylenols, the chloro-phenols, nitro-phenols, naphthols, paracyclohexaphenol, phenyl phenol, the phenylol methanes, as well as the polyhydric phenols, all of which are useful in the production of resins and which under various manipulations may be made to provide potentially reactive phenol resins of either the varnish, liquid resin, or solid pulverized resin types.

In the art at present high cutting speeds are called for. Expensive alloys must be ground with great precision and perfection, billets must be surfaced without the removal of too much metal. All this results in the production of wheels of long wear, maintaining their grinding dimensions over a substantial period of time and therefore calls for extremely tough, exceptionally hard wheels of a very dense nature. The prior art does not provide such wheels of synthetic resin bond. Vitreous bonded wheels are not capable of operating at high speeds and there is not sufficiently high cutting efficiency at the speeds which vitreous wheels can be safely operated.

As is indicated in the foregoing paragraphs the nature of the resin reaction must be modified, volatiles must be absorbed and the cure must be uniform through in order to provide uniformity and the hardness, density and cutting conditions which the new requirements demand. The phenol resins liberate water or ammonia or both during the reaction, the reactivity of the resin is retarded inside of a thick heavy section by various side reaction products which combine with the resin which prevent complete reaction and utmost strength. Wheels of large diameter of a density which permits of little porosity and a thickness of from two to four inches provide difficulties under curing conditions which have not been met by fillers or resins at present in use.

The difficulties have been such that many of the defects have been hidden and only apparent after storage for a long period of time under conditions of expansion and shrinkage due to variations in room temperature. Such defects in the past have been termed delaminations, that is there was apparently no blistering, the wheel itself did not bloat and when first made the abrasive wheel would show a safe speed test. Conditions of this kind are dangerous from a personal safety standpoint. The difficulty has been that in making these dense wheels various vagrant volatiles are present such as water, ammonia, etc. which act in a manner to oppose the setting of the resin to the same hardness and these gaseous volatiles will segregate along certain levels providing these delaminations, soft centers, etc.

Even when Durite S-1719, which is the liquid resin covered in the application of Emil E. Novotny, Serial No. 90,489, dated July 14, 1936, is used as the wetting agent, even though additional water was added, in the presence of a sufficient amount of the calcined magnesite such water is fixed during the curing cycle and there is no bloating, blistering or delamination. Similarly instead of using resins we can now use mixtures of phenol and aldehydes or phenol alcohols as wetting agents and the water of solution and/or reaction is combined without any harmful effects.

The plasticity of the mass provides another definite advantage in that through the use of a simple composition comprising abrasive grains, resin and magnesite we can by merely varying the plasticity or varying the pressure provide wheels having different densities without fear of blistering, bloating, etc.

While our preferred magnesium compound is of the heavy type, it is to be understood that we do not limit ourselves to the exact density of the magnesium compound, but we intend to include any magnesium compound or product containing substantial quantities of magnesium which will function as a comminuted filler and be reactive with the resins containing phenolic (OH) groups and providing the several functions described in more detail previously in the specification. More particularly the term "magnesium compound" embraces magnesium oxide or magnesite and preferably the heavy reactive products such as the heavy calcined magnesite but we do not specifically limit ourselves to these as there are other magnesium compounds and derivatives of magnesium which may be blended or so compounded as to provide products having these desired functions. The term "magnesium compound" embraces various compositions of magnesium and most specifically includes Dolomite. The term "reactive" or reference to reactivity in the specification and the claims is to be construed as covering the functions of plasticity, a slow drawn out complete reaction catalyst, a controlled alkalinity of mild form, the specific functional reaction toward phenolic resins and phenolic (OH) groups, the capability of absorbing and retaining volatiles such as water during the curing reaction, a breaking down of the resinates to provide phenolic (OH) groups available for substantially complete reaction, the regulation and substantial elimination of ammoniacal resinates, degradation products and aniline formation during the reaction, and finally the use of all, several or any of these functions in the production of an abrasive body compounded, formed and heat treated to provide for example an abrasive such as a wheel of great toughness and strength, great hardness when desired and a product which provides when desired the combination of attributes of grindability, strength and speed tolerance of the vitreous bonded and the resinoid bonded abrasive wheels, which may be, if desired, operated either at high or low peripheral speeds. While the word "oxide" in connection with magnesium and the choice of heavy calcined magnesite indicates such oxide it is to be understood that the claims should not be so limited where such magnesium compound fulfills the requirements herein stated.

The magnesium compound is to be used in comminuted form and the degree of fineness is of importance, the product being finer than the coarsest of the abrasive grains used in a medium or coarse abrasive wheel composition. Usually the product will pass through 60 mesh, but preferably 98% of the product will pass through 325 mesh. Therefore in the claims where we refer to a 60 mesh product or to a 325 mesh product it should be understood that we refer to commercial grinding and that therefore a minor percentage may not pass through these screens and that a major portion will pass through and may be considerably finer.

The specification and examples have been pertinently drawn to the manufacture of abrasive wheels, discs, blocks, segments, etc., but it is to be understood that the invention is not so limited, that we may make flexible backed abrasive bodies such as sandpaper or cloth, etc., wherein usually a single layer thickness of abrasive grains is used, or furthermore in the production of co-called set-up discs and wheels usually made up in the grinding departments of various industrial concerns.

While the specification calls for the use of abrasive grains in this mixture and is intended primarily to cover the manufacture of such abrasive bodies it is to be understood that the invention is likewise to cover various grinding bodies for use in paint and composition grinding or for use in the grinding of wood for paper pulp or in the grinding of paper pulp itself.

The following examples are given by way of illustration and it is to be understood that wide departures can be made in the proportions which are all given by weight, in the manner of mixing, etc., and that functional equivalents as covered in the specification shall be considered as a part of the spirit of the invention and within the scope of the appended claims.

Example I

In accordance with our invention we weigh out

| | Parts |
|---|---|
| Aluminous oxide No. 12 | 1400 |
| Durite 278 pulverized resin | 125 |
| Durite S-1719, S-1951 or S-1965 liquid resin | 75 |
| Calcined magnesite | 150 |

The abrasive grains are placed into a suitable mixer which may be a dough mixer or tumbling barrel and to this we then add the liquid resins S-1719, S-1951 or S-1965. These liquid resins may also be considered as resin liquids or solutions. Durite S-1719 is more particularly described in the co-pending application of Emil E. Novotny, Serial No. 90,489, dated July 14, 1936, now Patent No. 2,133,464, granted October 18, 1938. This product is capable of providing a wet mix with no vagrant resin which is self-converting to a dry mix in the presence of the dry pulverized resin. While Durite S-1719 contains a considerable quantity of water the calcined magnesite will fix such water during the curing cycle in the production of a hard dense substantially non-porous product.

Durite S-1951 is a product quite similar to Durite S-1719 with the exception, however, that an additional solvent such a furfuryl alcohol has been added and there is no objection to the use of such solvents inasmuch as these become fixed during the curing cycle. It will be noted that in usual liquid resin and dry resin mixes the ratio is 1:3 respectively as otherwise in heavy dense wheels there is danger of delaminations, blistering, etc., but that in the case of a mix including calcined magnesite the ratio in this example is approximately 2:3 and there is no danger of weakness or deformation. As a matter of fact in Example II we will show that a resin solution or liquid resin alone can be used without the dry pulverized resin.

After the abrasive grains have been thoroughly coated with either of these resin solutions we are ready to add the dry pulverized resin, and this is subsequently followed by the addition of the calcined magnesite, mixed for a sufficient length of time to provide a uniform granular free-flowing easily levelled mix. We find it, however, preferable to utilize Durite S-1999, which is a resin composition containing the proper proportions, as illustrated by this example, of calcined magnesite, which has been thoroughly dispersed and commingled with the resin so there is a close and uniform contact between the resin surfaces and the filler surfaces. In this case we use a sufficient amount of Durite S-1999 to take care of the total weights called for under the pulverized resin and magnesite in this formula. The mixing is thus expedited and the technical results are a marked improvement over the use of the components separately. If the percentage of magnesite is to be decreased regular Durite 278 may be added and if desirable may be intermixed with Durite S-1999, although this is not essential.

This granular mix is poured into a mold of desired size, levelled with a scraper bar, subjected to hydraulic pressure acting through a follower plate and pressed to a predetermined density. The unit pressure per square inch may be varied to provide a product ranging from a fairly porous open mass to one that is so dense that to the naked eye shows no discernible voids or porosity. We find that a unit pressure of 3000 to 4000 pounds per square inch gives us an extremely dense product in the order of 9.25 cubic inches per pound. By regulating the pressure we can produce bodies with varying degrees of volume per pound, as for example a more open product having a bulk of 11 cubic inches per pound. We find that this range of 9.25 to 11 cubic inches per pound inclusive gives us products of varying utility. That is, more specifically, the denser product provides slow cutting and finer finish and the relatively less dense product is freer cutting with a coarser finish. After the mixed mass is pressed the article is discharged from the mold and subjected to a step curing cycle ranging from 175° F. to 400° F. During this baking cycle the resinous bond is converted to infusibility and during this conversion the calcined magnesite has been reactive with respect to the resins and has functioned as previously described to produce a hard set strong product free from delaminations, blisters, etc.

Example II

As an example of our invention wherein we prefer to use a liquid resin or resin solution as the bond, we weigh out the following proportions:

| | Parts |
|---|---|
| Aluminous oxide No. 12 | 1400 |
| Durite S-1951 liquid resin | 200 |
| Calcined magnesite | 150 |

The liquid resin or resin solution is mixed with the abrasive grain and the magnesium compound is also thoroughly mixed therewith. By adjusting the viscosity of the resin solution, its proportion in the total mix, or its proportion with regard to the magnesium compound, we may provide products which are dough-like in consistency, but which granulate readily if desired by passing through a screen, and which may be tamped, pressed or rolled into shape in a suitable form or mold. However, by proper proportions a mix is provided which may be wet, but comprises discrete individual coated abrasive grains and upon standing a reaction takes place between the magnesium compound and the liquid resin and/or resin solution and the dry easily levelled, easily pourable granular mix is obtained. The products of any density are readily obtainable, various shapes can be formed or molded and the product is heat convertible under similar temperature gradient conditions as given under Example I. In this case the calcined magnesite likewise fixes volatiles and reacts with the resin in the manner previously disclosed.

Wherein we have called for liquid resins it is understood that these may be resin solutions, that the products need not necessarily be the phenol-aldehyde type, but may be liquid resins or solutions of those of the urea or alkyd type or those of vinyl acetate or chloride or mixtures or may comprise styrol resins or their functional bonding equivalents. The pulverized resins may consist of blends comprising phenol-aldehyde resins and including resins of the type as disclosed in the preceding sentence covering liquid resins or resin solutions.

It should therefore be understood that our claims embrace a potentially reactive resin composition admixed with suitable abrasive grains or bonding suitable abrasive grains, such resin composition comprising a potentially reactive phenolic resin and a reactive basic material, such basic material having balanced functional characteristics and alkalinity to provide an abrasive wheel which may be cured with the same assurance of uniformity of cure and density as though the act of heating were more or less the act of fusion of a vitreous bond and the carrying out of the chemical reaction during the cure is so balanced functionally that even a dense solid product will be free from delamination, undesired porosity and blistering, bloating and ununiform hardness, whereby a product can be made of a potentially reactive resinoid with but slight attention to the reaction involved, and thereby uniformly cured products can be had on the basis of commercial consistency. These balanced functional characteristics can briefly be set out as alkalinity sufficient to initially react with the phenolic (OH) groups to form resinates, the formation of such resinates with the increase in pH to activate the cure and to lead to a thoroughness or completeness of cure that where ammonia is liberated as through the use of hardening agents ammonolysis is eliminated or minimized and, furthermore, the alkalinity of the product and the resinates formed thereby is such that in the final stages of cure the normal consumption of phenolic (OH) groups is not inhibited or blocked due to the formation of too stable a resinate formation, but that this alkaline material is split off and is able to firmly fix the water that is liberated in the process of cure up to a maximum curing temperature of say approximately 400° F. There are other attributes in that the product functions likewise as a filler, that the product provides wetting properties to abrasive grains such as aluminous oxide and that through these various functional attributes a bond is produced which is so strong that a very high percentage of the abrasive grains will be broken at the point of cleavage.

In this application the claims are directed specifically to an abrasive composition, the method of preparing such abrasive composition and to the abrasive article itself. The application of Emil E. Novotny filed simultaneously herewith, Serial No. 201,185 dated April 9, 1938, entitled Phenol resin composition and method of preparing the same, covers the invention of making a composition of resin and such reactive filler in a potentially reactive form, the composition of the same and the method of making therefrom various plastic moldable masses and broadly the molded heat set articles including such resin and reactive filler.

What we claim is:

1. An abrasive composition comprising abrasive grains, a potentially reactive phenolic resin and a reactive magnesium oxide in finely comminuted form.

2. An abrasive composition comprising abrasive grains bonded with a potentially reactive resin containing phenolic (OH) groups and including a heavy calcined reactive magnesite in comminuted form.

3. An abrasive moldable composition comprising abrasive grains coated with a resin in liquid form, a pulverized resin and a reactive heavy calcined comminuted magnesite.

4. An abrasive molded and heat hardened article comprising abrasive grains, a phenolic resin and heavy calcined magnesite in comminuted form.

5. An abrasive article comprising abrasive grains wetted with a resin in solution and coated with a potentially reactive pulverized resin and a pulverized heavy reactive magnesite formed to suitable shape, heat hardened and set to a hard dense body.

EMIL E. NOVOTNY.
JOSEPH N. KUZMICK.